United States Patent
Shibai

(10) Patent No.: US 10,647,161 B2
(45) Date of Patent: May 12, 2020

(54) PNEUMATIC TIRE

(71) Applicant: The Yokohama Rubber Co., LTD., Minato-ku, Tokyo (JP)

(72) Inventor: Takashi Shibai, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 15/745,068

(22) PCT Filed: May 31, 2016

(86) PCT No.: PCT/JP2016/065976
§ 371 (c)(1),
(2) Date: Jan. 15, 2018

(87) PCT Pub. No.: WO2017/022308
PCT Pub. Date: Feb. 9, 2017

(65) Prior Publication Data
US 2018/0207991 A1 Jul. 26, 2018

(30) Foreign Application Priority Data
Jul. 31, 2015 (JP) .................................. 2015-152599

(51) Int. Cl.
*B60C 11/04* (2006.01)
*B60C 11/117* (2006.01)
(Continued)

(52) U.S. Cl.
CPC ............ *B60C 11/12* (2013.01); *B60C 11/032* (2013.01); *B60C 11/0304* (2013.01);
(Continued)

(58) Field of Classification Search
CPC ..... B60C 2011/0381; B60C 2011/0386; B60C 2011/0388; B60C 11/0304; B60C 11/032
See application file for complete search history.

(56) References Cited

U.S. PATENT DOCUMENTS

D725,584 S  *  3/2015  Ropars .......................... D12/516
2008/0092999 A1* 4/2008  Miyazaki ............ B60C 11/0306
                                                        152/209.15
(Continued)

FOREIGN PATENT DOCUMENTS

JP       2006151309 A    *   6/2006
JP       2008-105460         5/2008
(Continued)

OTHER PUBLICATIONS

Machine Translation: JP-2006151309-A; Yumii, Keita; (Year: 2019).*
(Continued)

*Primary Examiner* — Kendra Ly
(74) *Attorney, Agent, or Firm* — Thorpe North & Western

(57) ABSTRACT

Provided is a pneumatic tire including a tread portion, sidewall portions, and bead portions. The tread portion comprises a center main groove extending in the tire circumferential direction and a shoulder main groove located outward of the center main groove and extending in the tire circumferential direction. A land portion is defined between the center main groove and the shoulder main groove. The center main groove has a zigzag shape in the tire circumferential direction. Lug grooves extending inward from the shoulder main groove in the tire lateral direction and terminating without communicating with the center main groove are provided in the land portion. A bent portion bent toward a first side in the tire circumferential direction is formed at a terminating end of each of the lug grooves. Narrow grooves extending discontinuously in the tire circumferential direction without communicating with the bent portions are formed in the land portion.

6 Claims, 4 Drawing Sheets

(51) Int. Cl.
*B60C 11/12* (2006.01)
*B60C 11/03* (2006.01)

(52) U.S. Cl.
CPC ... *B60C 11/0306* (2013.01); *B60C 2011/0346* (2013.01); *B60C 2011/0348* (2013.01); *B60C 2011/0367* (2013.01); *B60C 2011/0381* (2013.01); *B60C 2011/0383* (2013.01); *B60C 2011/0388* (2013.01); *B60C 2011/1209* (2013.01); *B60C 2011/1227* (2013.01)

(56) References Cited

U.S. PATENT DOCUMENTS

| | | |
|---|---|---|
| 2012/0273104 A1 | 11/2012 | Ishida |
| 2013/0167997 A1* | 7/2013 | Hayashi .............. B60C 11/04 152/209.18 |
| 2014/0305559 A1* | 10/2014 | Takemoto .......... B60C 11/1236 152/209.8 |
| 2016/0368326 A1 | 12/2016 | Wakizono |
| 2017/0174009 A1 | 6/2017 | Suga |

FOREIGN PATENT DOCUMENTS

| | | | |
|---|---|---|---|
| JP | 2010-064514 | | 3/2010 |
| JP | 2010215172 A | * | 9/2010 |
| JP | 2012171479 A | * | 9/2012 |
| JP | 2012-228992 | | 11/2012 |
| JP | 2014-205410 | | 10/2014 |
| JP | 2015071373 A | * | 4/2015 |
| JP | 2015-123936 | | 7/2015 |
| JP | 2016-074256 | | 5/2016 |
| WO | WO 2015/098408 | | 7/2015 |
| WO | WO 2015/145909 | | 10/2015 |

OTHER PUBLICATIONS

Machine Translation: JP-2015071373-A; Kimura Shinya; (Year: 2019).*
Machine Translation: JP-2010215172-A; Hayashi, Akiko; (Year: 2019).*
Machine Translation: JP-2012171479-A; Miyasaka, Atsushi (Year: 2019).*
International Search Report for International Application No. PCT/JP2016/065976 dated Aug. 16, 2016, 4 pages, Japan.

* cited by examiner

PNEUMATIC TIRE

TECHNICAL FIELD

The present technology relates to a pneumatic tire including a tread portion including a center main groove extending in the tire circumferential direction, shoulder main grooves located outward of the center main groove and extending in the tire circumferential direction, and land portions extending in the tire circumferential direction defined between the center main groove and the shoulder main grooves; and particularly relates to a pneumatic tire including a tread pattern with an appropriate configuration that can achieve good steering stability on dry road surfaces and steering stability on wet road surfaces, which have a negative correlation, in a compatible manner and furthermore can provide improved uneven wear resistance.

BACKGROUND ART

Pneumatic tires have a tread pattern in which a plurality of rows of land portions are defined by a plurality of main grooves disposed in a tread portion and extend in the tire circumferential direction (for example, see Japanese Unexamined Patent Application Publication No. 2012-228992). Such pneumatic tires are provided with a plurality of lug grooves extending in the tire lateral direction in each of the land portions in the tread portion and thus ensure excellent drainage performance with the lug grooves.

Unfortunately, if the number of the lug grooves in the tread portion is increased, the rigidity of the tread portion decreases and steering stability on dry road surfaces declines. Conversely, if the number of the lug grooves in the tread portion is decreased, drainage performance decreases and steering stability on wet road surfaces declines. In this way, steering stability on dry road surfaces and steering stability on wet road surfaces have a negative correlation with each other, and it is difficult to enhance both simultaneously.

If the tread portion is subdivided by the main grooves and the lug grooves, the tread portion is susceptible to uneven wear due to nonuniform rigidity. To prevent uneven wear, there are constraints on the arrangement of the main grooves and the lug grooves. Thus, it is more difficult to enhance uneven wear resistance as well as achieving good steering stability on dry road surfaces and steering stability on wet road surfaces in a compatible manner.

SUMMARY

The present technology provides a pneumatic tire including a tread pattern with an appropriate configuration that can achieve good steering stability on dry road surfaces and steering stability on wet road surfaces, which have a negative correlation, in a compatible manner and furthermore can provide improved uneven wear resistance.

A pneumatic tire according to the present technology includes a tread portion extending in a tire circumferential direction and formed into an annular shape; a pair of sidewall portions disposed on both sides of the tread portion; and a pair of bead portions disposed inward of the sidewall portions in a tire radial direction. The tread portion includes a center main groove extending in the tire circumferential direction and a shoulder main groove located outward of the center main groove and extending in the tire circumferential direction; a land portion is defined between the center main groove and the shoulder main groove; the center main groove has a zigzag shape in the tire circumferential direction; a plurality of lug grooves are provided in the land portion, the lug grooves extending inward from the shoulder main groove in a tire lateral direction and terminating without communicating with the center main groove; a bent portion is formed at a terminating end of each of the lug grooves, the bent portion being bent toward a first side in the tire circumferential direction; a plurality of narrow grooves are formed in the land portion, the narrow grooves extending discontinuously in the tire circumferential direction without communicating with the bent portions; and the narrow grooves are arranged substantially parallel with the center main groove having the zigzag shape.

According to the present technology, the zigzag center main groove is provided in the tread portion, and the lug grooves are provided in the land portion between the zigzag center main groove and the shoulder main groove. This configuration can ensure steering stability on wet road surfaces. Especially the zigzag center main groove contributes to improvement in steering stability on wet road surfaces with edge effect thereof. Furthermore, the lug grooves extending inward from the shoulder main groove in the tire lateral direction are provided with the bent portions, and the narrow grooves are provided discontinuously in the tire circumferential direction. This configuration can increase the effect of enhancing wet performance with edge effect thereof.

The center main groove has a zigzag shape, and the lug grooves formed in the land portion adjacent to the center main groove terminate in the land portion. This configuration ensures sufficient rigidity of the land portion and achieves good steering stability on dry road surfaces and steering stability on wet road surfaces in a compatible manner at a higher level. Furthermore, the narrow grooves arranged substantially parallel with the zigzag center main groove make the rigidity of the land portion uniform and effectively prevent generation of uneven wear.

According to the present technology, an inclination angle $\alpha$ of the lug grooves including the bent portions with respect to the tire circumferential direction preferably ranges from 25° to 75°. By setting the inclination angle $\alpha$ of the lug grooves with respect to the tire circumferential direction in this range, the effect of enhancing steering stability on dry road surfaces can be sufficiently ensured.

A depth Ds of the narrow grooves and a depth Dc of the center main groove having the zigzag shape preferably satisfy a relationship of $0.10 \times Dc \leq Ds \leq 0.50 \times Dc$. A depth Ds of the narrow grooves in this range can effectively enhance steering stability on dry road surfaces and uneven wear resistance.

A distance d1 between the narrow grooves and the center main groove having the zigzag shape in a tire axial direction and a width d2 of the land portion in the tire axial direction preferably satisfy a relationship of $0.10 \times d2 \leq d1 \leq 0.40 \times d2$. A distance d1 between the narrow grooves and the zigzag center main groove in this range can exhibit the effect of enhancing uneven wear resistance to the utmost.

Preferably, the tread portion includes four main grooves including a pair of center main grooves extending in the tire circumferential direction and a pair of shoulder main grooves located outward of the center main grooves and extending in the tire circumferential direction; and at least one of the paired center main grooves has a zigzag shape in the tire circumferential direction. This arrangement of the main grooves can enhance steering stability on dry road surfaces, steering stability on wet road surfaces, and uneven wear resistance in a compatible manner.

DETAILED DESCRIPTION

Figure 1:
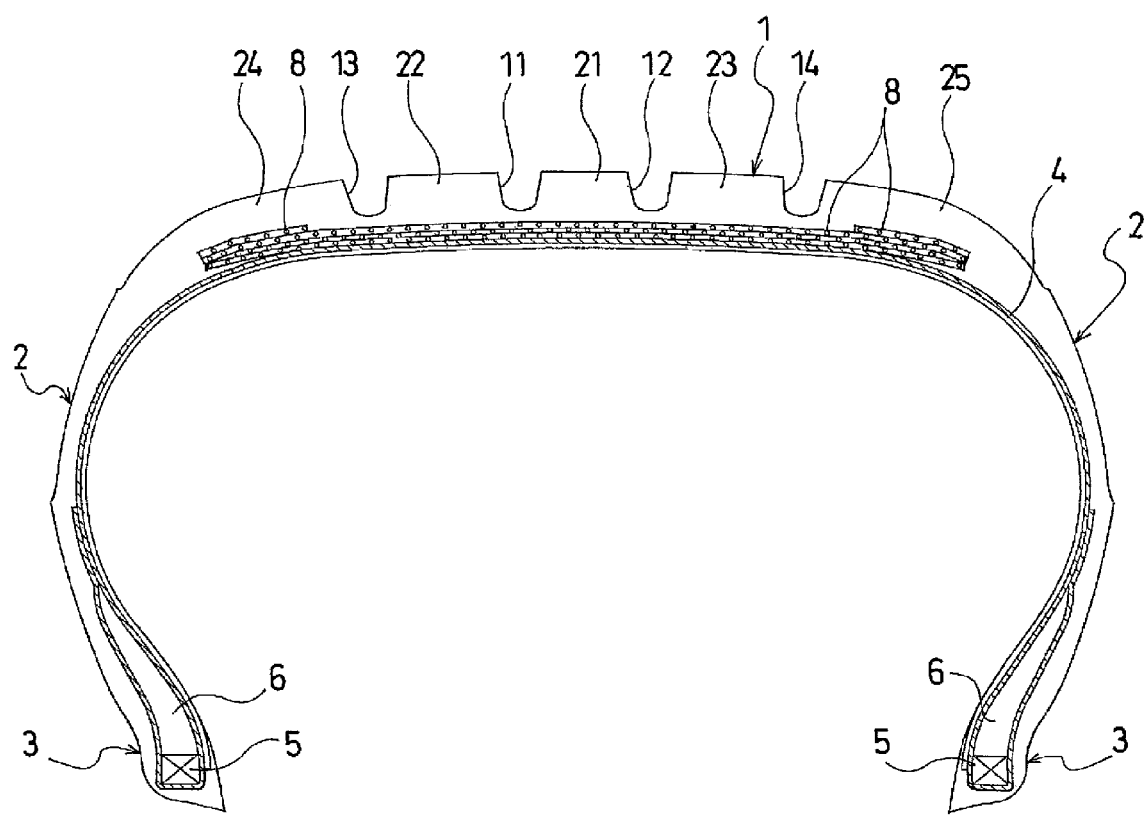
FIG. 1 is a meridian cross-sectional view illustrating a pneumatic tire according to an embodiment of the present technology.
Figure 2:
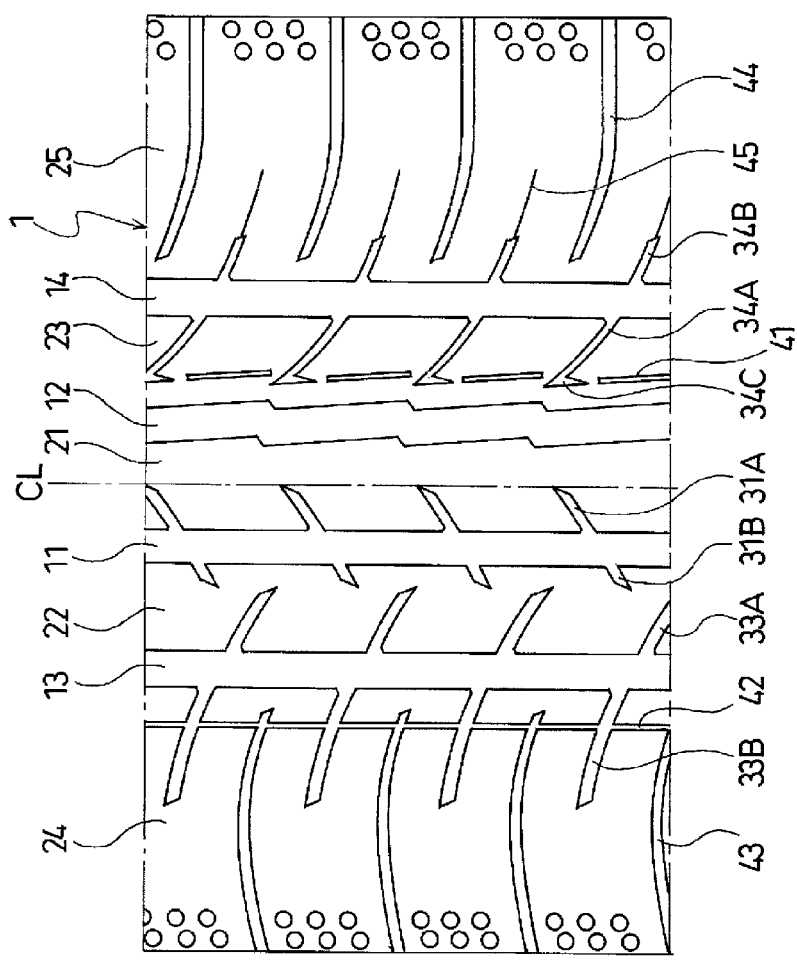
FIG. 2 is a developed view illustrating a tread pattern of the pneumatic tire in FIG. 1.
Figure 3:
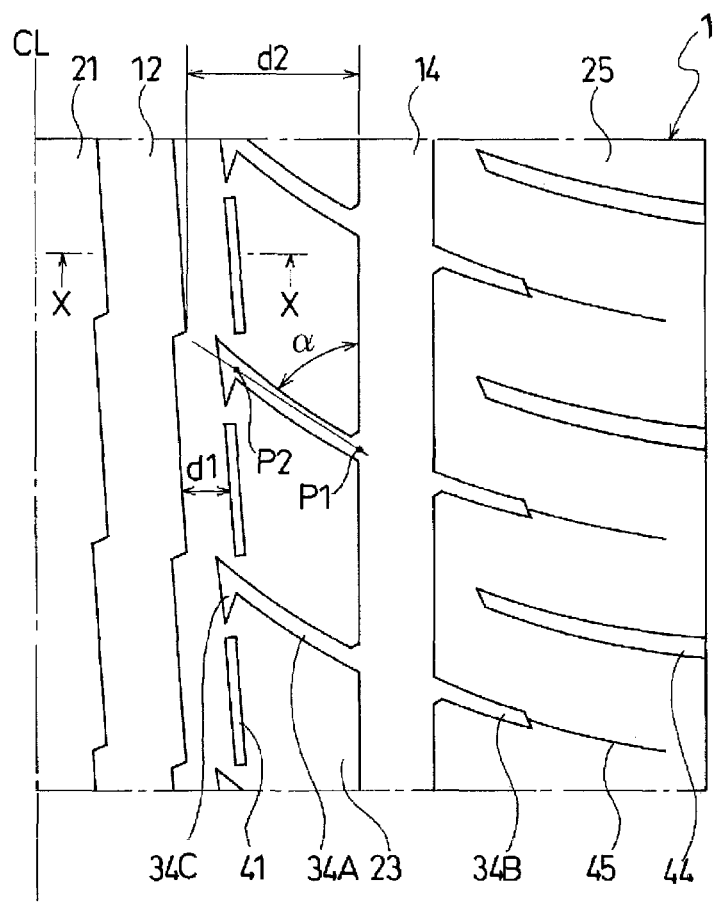
FIG. 3 is a plan view illustrating the main portion of the tread pattern in FIG. 2.

Configurations according to the present technology is described below in detail with reference to the accompanying drawings. FIGS. 1 to 3 illustrate a pneumatic tire according to an embodiment of the present technology.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3, 3. The carcass layer 4 includes a plurality of reinforcing cords extending in the tire radial direction, and is folded back around a bead core 5 disposed in each of the bead portions 3 from a tire inner side to a tire outer side. A bead filler 6 having a triangular cross-sectional shape formed from rubber composition is disposed on a periphery of the bead core 5.

On the other hand, a plurality of belt layers 7 are embedded on an outer circumferential side of the carcass layer 4 in the tread portion 1. The belt layers 7 include a plurality of reinforcing cords that incline with respect to the tire circumferential direction, and the directions of the reinforcing cords of the different layers intersect each other. In the belt layers 7, an inclination angle of the reinforcing cords with respect to the tire circumferential direction is set in a range from, for example, 10° to 40°. Steel cords are preferably used as the reinforcing cords of the belt layers 7. For the purpose of improving high-speed durability, at least one layer of a belt cover layer 8 formed by arranging reinforcing cords at an angle of, for example, not greater than 5° with respect to the tire circumferential direction, is disposed on an outer circumferential side of the belt layers 7. Nylon, aramid, or similar organic fiber cords are preferably used as the reinforcing cords of the belt cover layer 8.

Note that the tire internal structure described above is exemplary of a pneumatic tire, but is not limited thereto.

As illustrated in FIG. 2, four main grooves 11 to 14 extending in the tire circumferential direction are formed in the tread portion 1. That is, a pair of center main grooves 11, 12 located on both sides of a tire equator CL and a pair of shoulder main grooves 13, 14 located outward of the center main grooves 11, 12 in the tire lateral direction are formed in the tread portion 1. The center main groove 12 has a zigzag shape in the tire circumferential direction, whereas the other main grooves 11, 13, 14 are linear. These four main grooves 11 to 14 define, in the tread portion 1, a center land portion 21 located on the tire equator CL, an intermediate land portion 22 located on a first side of the center land portion 21 in the tire lateral direction, an intermediate land portion 23 located on a second side of the center land portion 21 in the tire lateral direction, a shoulder land portion 24 located on the first side of the intermediate land portion 22 in the tire lateral direction, and a shoulder land portion 25 located on the second side of the intermediate land portion 23 in the tire lateral direction.

A plurality of lug grooves 31A, 31B, 33A, 33B, 34A, 34B extending from the main grooves 11, 13, 14, except the zigzag center main groove 12, toward both sides in the tire lateral direction and terminating in the land portions 21 to 25 are formed at intervals in the tire circumferential direction in the tread portion 1.

Specifically, the lug grooves 31A each communicate with the center main groove 11 at a first end and terminate within the center land portion 21 at a second end, and the lug grooves 31B each communicate with the center main groove 11 at a first end and terminate within the intermediate land portion 22 at a second end. The lug grooves 33A each communicate with the shoulder main groove 13 at a first end and terminate within the intermediate land portion 22 at a second end, and the lug grooves 33B each have a first end communicating with the shoulder main groove 13 and a second end terminating in the shoulder land portion 24. The lug grooves 34A each communicate with the shoulder main groove 14 at a first end and terminate within the intermediate land portion 23 at a second end, and the lug grooves 34B each have a first end communicating with the shoulder main groove 14 and a second end terminating in the shoulder land portion 25.

Note that the lug grooves 31A and the lug grooves 31B are preferably arranged facing each other but may be arranged, for example, offset in position in the tire circumferential direction to alleviate pattern noise. Such a relationship is also applied to the arrangement of the lug grooves 33A and the lug grooves 33B and the arrangement of the lug grooves 34A and the lug grooves 34B.

The lug grooves 34A extending inward from the shoulder main groove 14 in the tire lateral direction each include a bent portion 34C at the terminating end in the intermediate land portion 23. The bent portion 34C is bent into a hook shape toward a first side in the tire circumferential direction. In the intermediate land portion 23 in which the lug grooves 34A including the bent portions 34C are formed, a plurality of narrow grooves 41 are formed extending discontinuously in the tire circumferential direction without communicating with the bent portions 34C. The narrow grooves 41 have a groove width of 3.0 mm or less and contain so-called sipes. The narrow grooves 41 are arranged substantially parallel with the zigzag center main groove 12.

It is not necessary that the narrow grooves 41 are exactly parallel with the center main groove 12. The narrow grooves 41 and the center main groove 12 can be regarded as being substantially parallel with each other when $(d1max-d1min)/d1max \leq 0.1$ is satisfied, where d1 is a distance between the narrow grooves 41 and the center main groove 12 in the tire axial direction, d1min is the minimum value of the distance d1, and d1max is the maximum value of the distance d1.

A circumferential auxiliary groove 42 extending in the tire circumferential direction is formed in the shoulder land portion 24. The circumferential auxiliary groove 42 has a groove width ranging from 0.8 mm to 3.0 mm. A plurality of shoulder lug grooves 43 extending inward from an end portion of the tread portion 1 in the tire lateral direction are formed at intervals in the tire circumferential direction in the shoulder land portion 24. The shoulder lug grooves 43 intersect the circumferential auxiliary groove 42 and terminate without reaching the shoulder main groove 13.

A plurality of shoulder lug grooves 44 extending inward from an end portion of the tread portion 1 in the tire lateral direction are formed at intervals in the tire circumferential direction in the shoulder land portion 25. The shoulder lug grooves 44 terminate without reaching the shoulder main groove 14. A plurality of sipes 45 extending outward from tip portions of the lug grooves 34B in the tire lateral direction are formed in the shoulder land portion 25.

The above-described pneumatic tire is provided, in the tread portion 1, with the zigzag center main groove 12 and the lug grooves 34A in the intermediate land portion 23 between the zigzag center main groove 12 and the shoulder main groove 14. Thus, steering stability on wet road surfaces can be ensured. In particular, the zigzag center main groove 12 with its edge effect contributes to improvement in steering stability on wet road surfaces. Furthermore, the lug grooves 34A extending inward from the shoulder main groove 14 in the tire lateral direction are provided with the bent portions 34C, and the narrow grooves 41 are provided discontinuously in the tire circumferential direction. This configuration can increase the effect of enhancing wet performance with the edge effect thereof.

The center main groove 12 has a zigzag shape, and the lug grooves 34A formed in the land portion 23 adjacent to the center main groove 12 terminate in the land portion 23. This configuration ensures sufficient rigidity of the land portion 23 and achieves good steering stability on dry road surfaces and steering stability on wet road surfaces in a compatible manner to a high degree. Furthermore, the narrow grooves 41 arranged substantially parallel with the zigzag center main groove 12 make the rigidity of the land portion 23 uniform and effectively prevent generation of uneven wear.

The pneumatic tire is provided, in the tread portion 1, with the lug grooves 31A, 31B, 33A, 33B, 34A, 34B extending from the main grooves 11, 13, 14, except the zigzag center main groove 12, toward both sides in the tire lateral direction and terminating in the land portions 21 to 25 and can thus ensure excellent drainage performance while minimizing a decrease in the rigidity of the tread portion 1. That is, the lug grooves 31A, 31B, 33A, 33B, 34A, 34B do not completely divide the land portions 21 to 25 while exhibiting effective drainage performance by guiding water on road surfaces to the main grooves 11, 13, 14, so that the high rigidity of the tread portion 1 can be maintained. This configuration achieves good steering stability on dry road surfaces and steering stability on wet road surfaces in a compatible manner to a high degree.

As illustrated in FIG. 3, in the pneumatic tire, an inclination angle $\alpha$ of the lug grooves 34A including the bent portions 34C with respect to the tire circumferential direction is preferably in a range from 25° to 75°. By setting the inclination angle $\alpha$ of the lug grooves 34A with respect to the tire circumferential direction in this range, the effect of enhancing steering stability on dry road surfaces can be sufficiently ensured. An inclination angle $\alpha$ of less than 25° forms acute portions in the land portion 23 and thus locally decreases the rigidity, resulting in an adverse effect on steering stability on dry road surfaces. Conversely, an inclination angle $\alpha$ of greater than 75° causes both sides of the lug grooves 34A to exhibit different behavior and thus decreases the rigidity as a pattern, resulting in an adverse effect on steering stability on dry road surfaces. Note that the inclination angle $\alpha$ of the lug grooves 34A refers to the angle of a straight line connecting groove width center positions P1, P2 on both longitudinal sides of the lug grooves 34A except the bent portion 34C, with respect to the tire circumferential direction.

Figure 4:
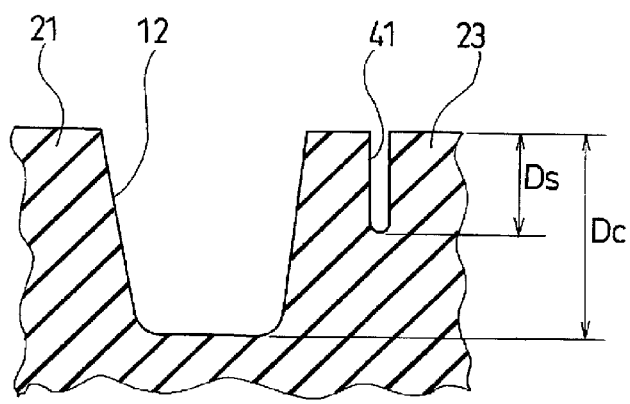
FIG. 4 is a cross-sectional view taken along line X-X in FIG. 3.

As illustrated in FIG. 4, in the pneumatic tire, a depth Ds of the narrow grooves 41 and a depth Dc of the zigzag center main groove 12 preferably satisfy a relationship of $0.10 \times Dc \leq Ds \leq 0.50 \times Dc$. A depth Ds of the narrow grooves 41 in this range can effectively enhance steering stability on dry road surfaces and uneven wear resistance. A ratio Ds/Dc of less than 0.10 decreases the effect of enhancing uneven wear resistance, and conversely, a ratio Ds/Dc of greater than 0.50 decreases the rigidity of the land portion 23, resulting in an adverse effect on steering stability on dry road surfaces.

In the pneumatic tire, the distance d1 between the narrow grooves 41 and the zigzag center main groove 12 in the tire axial direction and a width d2 of the land portion 23 in the tire axial direction preferably satisfy a relationship of $0.10 \times d2 \leq d1 \leq 0.40 \times d2$. A distance d1 between the narrow grooves 41 and the zigzag center main groove 12 in this range can exhibit the effect of enhancing uneven wear resistance to the utmost. A ratio d1/d2 outside this range does not sufficiently make the rigidity of the land portion 23 uniform, resulting in a decrease in the effect of enhancing uneven wear resistance. Note that the width d2 of the land portion 23 refers to the minimum width of the land portion 23 adjacent to the zigzag center main groove 12 and that if the distance d1 between the narrow grooves 41 and the center main groove 12 varies, the distance d1 refers to the average value of the minimum value d1min and the maximum value d1 max of the distance d1.

The above-described embodiment has exemplified the case in which the pair of center main grooves 11, 12 and the pair of shoulder main grooves 13, 14 are disposed in the tread portion 1, and the center main groove 12 among the main grooves has a zigzag shape in the tire circumferential direction. However, in the present technology, both the paired center main grooves 11, 12 may have zigzag shapes in the tire circumferential direction. For example, the configuration of the right side of the tire equator CL in the tread pattern in FIG. 2 can be applied to the left side of the tire equator CL in a mirror or point symmetrical manner. Alternatively, the configuration of the left side of the tire equator CL in the tread pattern can be selected as desired as long as the right side has the configuration illustrated in FIG. 2.

EXAMPLES

Tires of Examples 1 to 7 were manufactured with a tire size of 215/55R17. The pneumatic tires each included a tread portion, a pair of sidewall portions, and a pair of bead portions. As illustrated in FIG. 2, the pneumatic tire was provided, in the tread portion, with four main grooves including a pair of center main grooves extending in the tire circumferential direction and a pair of shoulder main grooves located outward of the center main grooves and extending in the tire circumferential direction; these main grooves defined five rows of land portions; one of the center main grooves had a zigzag shape in the tire circumferential direction, and the other main groove had a straight shape; a plurality of lug grooves extending inward from the shoulder main groove in the tire lateral direction and terminating without communicating with the center main groove were provided in the land portion located between the zigzag center main groove and the shoulder main groove; the lug grooves included bent portions bent toward the first side in the tire circumferential direction at the terminating ends; a plurality of narrow grooves extending discontinuously in the tire circumferential direction without communicating with the bent portions were formed in the land portion; and the narrow grooves were arranged substantially parallel with the zigzag center main groove.

A tire of Conventional Example was prepared for comparison. The tire was provided, in the tread portion, with four main grooves including a pair of center main grooves extending in the tire circumferential direction and a pair of shoulder main grooves located outward of the center main grooves and extending in the tire circumferential direction; these main grooves defined five rows of land portions; all the main grooves had a straight shape; and a plurality of lug grooves communicating with the main grooves on both sides thereof were provided between the main grooves.

A tire of Comparative Example 1 was prepared that had the same configuration as the tire of Example 1 except that all the main grooves had a straight shape and that the bent portions of the lug grooves and the narrow grooves were not provided. A tire of Comparative Example 2 was prepared that had the same configuration as the tire of Example 1 except that the bent portions of the lug grooves and the narrow grooves were not provided.

For Examples 1 to 7 and Comparative Examples 1 and 2, the inclination angle α of the lug grooves including the bent portions, the depth Ds of the narrow grooves, the depth Dc of the center main groove, the distance d1 between the narrow grooves and the center main groove, and the width d2 of the land portion including the narrow grooves were set as shown in Table 1.

These test tires were evaluated for steering stability on dry road surfaces, steering stability on wet road surfaces, and uneven wear resistance according to the following test methods. The results thereof are shown in Table 1.

Steering Stability on Dry Road Surfaces:

The test tires were assembled on wheels having a rim size of 17×7.5J and mounted on a front wheel drive vehicle of 2400 cc engine displacement, and the air pressure (F/R) after warm-up was set to 230 kPa/220 kPa. After the vehicle traveled on a dry road surface, panelists conducted sensory evaluation. Evaluation results were expressed as index values with the Conventional Example being defined as 100. Larger index values indicate superior steering stability on dry road surfaces.

Steering Stability on Wet Road Surfaces:

The test tires were assembled on wheels having a rim size of 17×7.5J and mounted on a front wheel drive vehicle of 2400 cc engine displacement, and the air pressure (F/R) after warm-up was set to 230 kPa/220 kPa. The lap time was measured under a rainy condition on a paved test course. The evaluation results were expressed, using the reciprocal of the measured value, with the value of the Conventional Example being defined as 100. Larger index values indicate superior steering stability on wet road surfaces.

Uneven Wear Resistance:

The test tires were assembled on wheels having a rim size of 17×7.5J and mounted on a front wheel drive vehicle of 2400 cc engine displacement, and the air pressure (F/R) after warm-up was set to 230 kPa/220 kPa. After the vehicle traveled 10000 km in the market, the amounts of wear of the center main grooves and the shoulder main grooves were measured, and the difference between the amounts was calculated. The evaluation results were expressed, using the reciprocal of the difference, as index values, with the value of the Conventional Example being defined as 100. Larger index values indicate superior uneven wear resistance.

TABLE 1

|  | Conventional Example | Comparative Example 1 | Comparative Example 2 | Example 1 | Example 2 |
|---|---|---|---|---|---|
| Zigzag center main groove? | No | No | Yes | Yes | Yes |
| Bent portions of lug grooves and narrow grooves? | No | No | No | Yes | Yes |
| Inclination angle α of lug grooves including bent portions (°) | — | — | — | 50 | 25 |
| Depth Ds of narrow grooves (mm) | — | — | — | 3.2 | 3.2 |
| Depth Dc of center main groove (mm) | 8.0 | 8.0 | 8.0 | 8.0 | 8.0 |
| Distance d1 between narrow grooves and center main groove (mm) | — | — | — | 6.2 | 6.2 |
| Width d2 of land portion including narrow grooves (mm) | 23 | 23 | 23 | 23 | 23 |
| Steering stability on dry road surfaces (index value) | 100 | 104 | 104 | 104 | 102 |
| Steering stability on wet road surfaces (index value) | 100 | 105 | 108 | 110 | 110 |
| Uneven wear resistance (index value) | 100 | 100 | 100 | 108 | 108 |

|  | Example 3 | Example 4 | Example 5 | Example 6 | Example 7 |
|---|---|---|---|---|---|
| Zigzag center main groove? | Yes | Yes | Yes | Yes | Yes |
| Bent portions of lug grooves and narrow grooves? | Yes | Yes | Yes | Yes | Yes |
| Inclination angle α of lug grooves including bent portions (°) | 75 | 50 | 50 | 50 | 50 |

TABLE 1-continued

| | | | | | |
|---|---|---|---|---|---|
| Depth Ds of narrow grooves (mm) | 3.2 | 0.8 | 4.0 | 3.2 | 3.2 |
| Depth Dc of center main groove (mm) | 8.0 | 8.0 | 8.0 | 8.0 | 8.0 |
| Distance d1 between narrow grooves and center main groove (mm) | 6.2 | 6.2 | 6.2 | 2.3 | 9.2 |
| Width d2 of land portion including narrow grooves (mm) | 23 | 23 | 23 | 23 | 23 |
| Steering stability on dry road surfaces (index value) | 103 | 104 | 102 | 103 | 106 |
| Steering stability on wet road surfaces (index value) | 110 | 110 | 110 | 112 | 110 |
| Uneven wear resistance (index value) | 108 | 104 | 106 | 105 | 105 |

As can be seen from Table 1, in the tires of Examples 1 to 7, steering stability on dry road surfaces and steering stability on wet road surfaces were enhanced simultaneously, and furthermore uneven wear resistance was enhanced, in comparison with the tire of Conventional Example. The tires of Examples 1 to 7 also achieved excellent results in comparison with the tire of Comparative Example 1 that was not provided with the zigzag center main groove, the lug grooves including the bent portions, and the narrow grooves, and the tire of Comparative Example 2 that was not provided with the lug grooves including the bent portions and the narrow grooves.

The invention claimed is:

1. A pneumatic tire comprising:
   a tread portion extending in a tire circumferential direction and formed into an annular shape;
   a pair of sidewall portions disposed on both sides of the tread portion; and
   a pair of bead portions disposed inward of the sidewall portions in a tire radial direction;
   the tread portion comprising a center main groove extending in the tire circumferential direction and a shoulder main groove located outward of the center main groove and extending in the tire circumferential direction;
   a land portion being defined between the center main groove and the shoulder main groove;
   the center main groove having a zigzag shape in the tire circumferential direction;
   a plurality of lug grooves being provided in the land portion, the plurality of lug grooves extending inward from the shoulder main groove in a tire lateral direction and terminating without communicating with the center main groove;
   a bent portion being formed at a terminating end of each of the plurality of lug grooves, the bent portion being bent into a hook shape toward a first side in the tire circumferential direction, each of the plurality of lug grooves inclining from the shoulder main groove toward a second side in the tire circumferential direction;
   a plurality of narrow grooves being formed in the land portion, the narrow grooves extending discontinuously in the tire circumferential direction without communicating with the bent portions;
   a depth Ds of the plurality of narrow grooves and a depth Dc of the center main groove having the zigzag shape satisfying a relationship of $0.10 \times Dc \leq Ds \leq 0.19 \times Dc$; and
   the plurality of narrow grooves being arranged substantially parallel with the center main groove having the zigzag shape.

2. The pneumatic tire according to claim 1, wherein an inclination angle a of the plurality of lug grooves comprising the bent portions with respect to the tire circumferential direction ranges from 25° to 75°.

3. The pneumatic tire according to claim 2, wherein a distance d1 between the narrow grooves and the center main groove having the zigzag shape in a tire axial direction and a width d2 of the land portion in the tire axial direction satisfy a relationship of $0.10 \times d2 \leq d1 \leq 0.40 \times d2$.

4. The pneumatic tire according to claim 3, wherein:
   the tread portion comprises four main grooves comprising a pair of center main grooves extending in the tire circumferential direction and a pair of shoulder main grooves located outward the center main grooves and extending in the tire circumferential direction; and
   the pair of center main grooves includes the center main groove having the zigzag shape and the pair of shoulder main grooves includes the shoulder main groove.

5. The pneumatic tire according to claim 1, wherein a distance d1 between the narrow grooves and the center main groove having the zigzag shape in a tire axial direction and a width d2 of the land portion in the tire axial direction satisfy a relationship of $0.10 \times d2 \leq d1 \leq 0.40 \times d2$.

6. The pneumatic tire according to claim 1, wherein:
   the tread portion comprises four main grooves comprising a pair of center main grooves extending in the tire circumferential direction and a pair of shoulder main grooves located outward the center main grooves and extending in the tire circumferential direction; and
   the pair of center main grooves includes the center main groove having the zigzag shape and the pair of shoulder main grooves includes the shoulder main groove.

* * * * *